May 29, 1956 W. B. TYSON 2,747,941
COTTON PICKING MACHINE
Filed Aug. 16, 1955

INVENTOR.
WENDELL B. TYSON
BY

McMorrow, Berman & Davidson
ATTORNEYS

United States Patent Office 2,747,941
Patented May 29, 1956

2,747,941

COTTON PICKING MACHINE

Wendell B. Tyson, Rocky Mount, N. C.

Application August 16, 1955, Serial No. 528,600

2 Claims. (Cl. 302—27)

This invention relates to a self-propelled manual cotton picking machine.

The primary object of the invention is to provide an efficient low-cost device of the character indicated above which speeds up and makes easier picking cotton by hand, and provides in great measure the advantages of mechanical cotton picking.

Another object of importance is to provide a device as stated which is particularly adapted for use on small, low swung, riding tractors of the so-called "garden tractor" type.

Another object of importance is to provide a device as stated which is arranged to facilitate manual picking of the cotton by the driver of the tractor while riding on the tractor on which the device is mounted, so that a single individual can both drive the tractor and pick the cotton.

Another object of importance is to provide a device as stated which includes suction picking means attachable to the hands of the tractor driver or operator, which do not interfere in any manner with the ordinary operation of the tractor, and constructed to cause cotton bolls to be sucked into hoses extending away from the hands of the operator, to a conveniently located hopper on the tractor.

Other objects will appear from the following description, the claims appended thereto, and from the annexed drawing, in which like reference characters designate like parts throughout the several views, and wherein:

Figure 1:
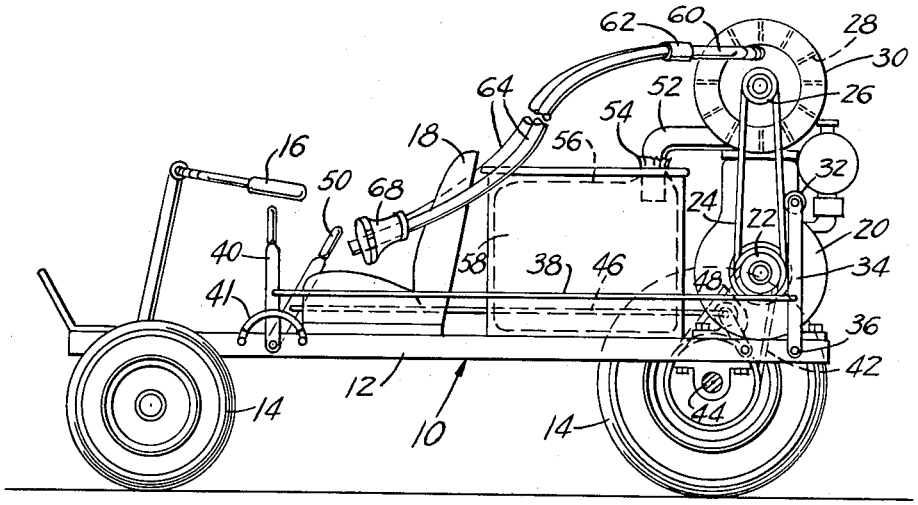
Figure 1 is a side elevational view of a cotton picking machine according to the present invention.
Figure 2:
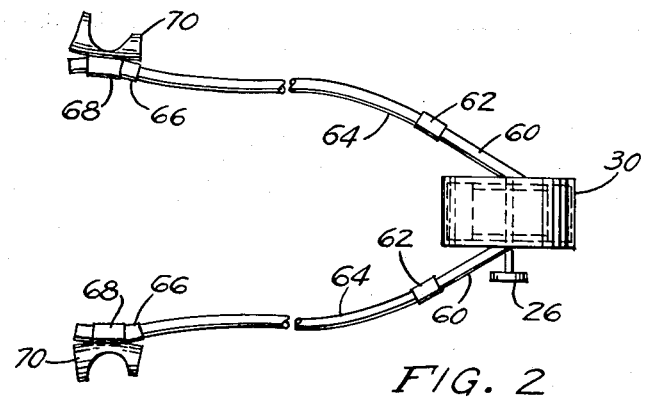
Figure 2 is a top plan view of the hand-attached suction picking means and associated blower.

Referring to the drawings in detail, the numeral 10 generally designates a basically conventional, low swung riding tractor of the garden type. This includes a chassis 12, having fixed rear drive wheels 13 and steerable front wheels 14 controlled by a steering bar 16. An operator's seat 18 is disposed immediately rearwardly of the steering bar, and spaced rearwardly from the operator's seat and over the rear or drive wheels 13, there is mounted on the chassis an internal combustion engine 20. Engine 20 has a laterally projecting shaft, to which is secured a drive pulley 22 about which is trained a drive belt 24 extending to and trained about a driven pulley 26 secured to the shaft 25 of a blower 28 having a housing 30 mounted above the motor or engine 20.

To place the belt 24 under tension, there is provided a tensioning pulley 32, carried by the upper end of an arm 34, the lower end of which is pivotally connected at 26 to the chassis, and an elongated connecting rod 38, pivotally connected at one end to the intermediate portion of arm 34, is pivotally connected at its other end to the intermediate portion of a lever 40 pivotally attached at its lower end to the chassis 12 in front of the driver's seat 18. The lever 40 traverses an arcuate segment 41, and suitable dog means is employed for the purpose of holding the lever 40 in selected positions to which it is swung, thus to maintain the belt 24 under a selected, predetermined amount of tension. Due to this arrangement, the pulley 32 constitutes means for drivingly engaging the blower with the motor, since when the lever 40 is swung in a clockwise direction about its pivot, to the right in Figure 1, pulley 32 is shifted out of engagement with the belt 24, and under these circumstances, so much slack develops in the belt as to prevent the belt from rotating the blower shaft pulley 26. Thus, the user at any time can disengage the driving connection between the motor and blower.

The motor is also used to propel the tractor through a pulley 39 secured to the motor shaft 21, about which is trained a drive belt 42 passing about a pulley 45 secured to the rear wheel axle 44 of the tractor. It will be understood that suitable gear reduction means as well as differential means can be employed in the driving connection between the motor and the rear axle, these being well within the skill of those working within the art, and hence do not require illustration herein. The axle 44, in this connection, can also be disconnected from the motor, through the medium of a connecting rod 46 pivotally attached at one end to an arm 48, the arm 48 being pivotally mounted upon the chassis 12 and having a roller 49 engaging the belt 42. A lever 50 pivoted on the chassis 12 is connected to the forward end of the rod 46, and is operable like the lever 40. Thus, whenever it is desired to disengage the driving connection between the motor and the rear axle, the lever 50 is shifted to a position to disengage the roller 49 carried by arm 48 from the belt 42. As a result, though the motor still operates, the axle 44 will not turn and the tractor remains stationary.

Connected to the outlet of the blower 30 is an outlet pipe 52, having a depending extension at its free end about which is tied the mouth 54 of a bag 56 contained in an upstanding hopper 58 mounted upon the chassis between the vehicle operator's seat 18 and the motor 20. The bag is of open mesh, for the purpose of permitting air to freely pass therethrough, while still retaining therein picked bolls discharged thereinto from the blower.

Connected to opposite sides of the blower housing 30, in such positions as to cause air to be sucked therethrough into the blower housing, are forwardly divergent inlet pipes 60, connected by fittings 62 to flexible tubes or hoses 64. The pipes 60 and hoses 64 constitute inlet conduits for the picked cotton bolls, and as will be noted, the respective conduits are of such length as to extend fully up to and slightly beyond the driver's seat.

Figure 3:
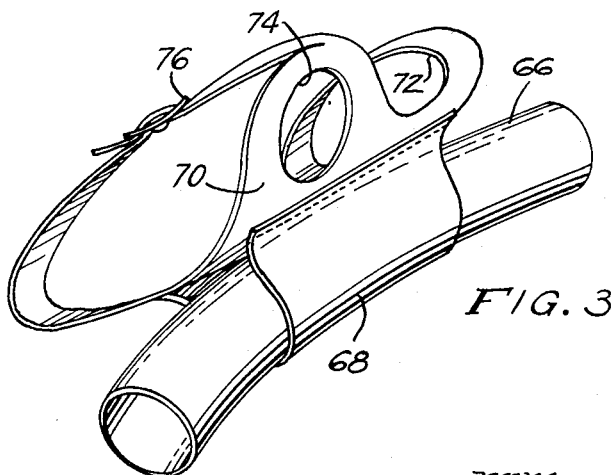
Figure 3 is a greatly enlarged, fragmentary perspective view of one of the suction picking means.

Referring now to Figure 3, extended about the inlet ends 63 of the hoses 64 are flexible attaching sleeves 68 of canvas webbing or the like. Stitched to or otherwise secured to the sleeves are tubular hand coverings 70, also of canvas webbing or the like, having wrist straps 72 and hand strap portions 73 provided with thumb openings 74. The hand strap portions 73 are provided with straps 75 and 77 connected by a buckle 76, for the purpose of permitting them to be adjusted to and secured firmly about the hands of the user. When the device is in use, the hand coverings are attached to the hands, and thereby the inlet ends 63 of the hoses 64 are so disposed as to be readily manipulable by the operator, in close proximity to the cotton bolls to be picked. As a result, with the motor in operation and suction set up within the hoses, suction is caused at the inlet ends of the hoses, and this tends to suck the hand picked bolls off the fingers of the operator into the hoses 64, for passage through the blower, and the discharge pipe 52 into the bag 56.

The construction, as will be noted, is such that a single driver can operate the tractor, halting it at intervals during movement of the tractor along a row of cotton plants, for the purpose of picking the cotton off the plants. Cotton can thus be picked from one side of plants during passage of the machine along a row in one direction, and then can pick cotton from the other sides of the plants during passage of the machine along the same row in an opposite or return direction.

Apart from the above, the device is so designed as to permit the same to be readily converted to a crop dusting machine, since the direction of travel of the blower can be reversed, so as to cause air, which air can be charged with powdered insecticide or the like, to be blown out of the tubes 64 rather than sucked thereinto. Still further, the machinery does not interfere with normal use of the garden tractor in, for example, drawing cultivator implements or other agricultural tools.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. In a self-propelled manual cotton picking machine, a horizontal chassis having forward steerable ground-engaging wheel means and rear fixed drive wheel means, a forward driver's seat on the chassis, a motor mounted on the chassis over the rear drive wheel means, a suction blower mounted on said motor, first means operatively connecting the motor to said blower, second means operatively connecting the motor to said rear drive wheel means, said blower having cotton inlet means and cotton discharge means, a hopper on said chassis between said motor and the driver's seat into which said discharge means discharges, cotton suction hoses having rear ends connected to the cotton discharge means and open forward ends reaching forwardly to the region of the driver's seat, and manual means on the forward ends of the hoses for directing the forward ends of the hoses from the driver's seat.

2. In a self-propelled manual cotton picking machine, a horizontal chassis having forward steerable ground-engaging wheel means and rear fixed drive wheel means, a forward driver's seat on the chassis, a motor mounted on the chassis over the rear drive wheel means, a suction blower mounted on said motor, first means operatively connecting the motor to said blower, second means operatively connecting the motor to said rear drive wheel means, said blower having cotton inlet means and cotton discharge means, a hopper on said chassis between said motor and the driver's seat into which said discharge means discharges, cotton suction hoses having rear ends connected to the cotton discharge means and open forward ends reaching forwardly to the region of the driver's seat, and manual means on the forward ends of the hoses for directing the forward ends of the hoses from the driver's seat, first and second levers pivoted to the chassis in the region of the driver's seat, said first and second levers being severally connected to said first and second connecting means for selectively registering said first and second connecting means operative and inoperative.

References Cited in the file of this patent
UNITED STATES PATENTS
1,624,308    Brown ---------------- Apr. 12, 1927